United States Patent [19]

Rehfeld

[11] Patent Number: 4,614,676

[45] Date of Patent: Sep. 30, 1986

[54] MULTIPLE WINDOW GLASS HAVING THERMAL AND ACOUSTICAL INSULATING PROPERTIES

[75] Inventor: Marc Rehfeld, Montmagny, France

[73] Assignee: Saint-Gobain Vitrage, Courbevoie, France

[21] Appl. No.: 510,211

[22] Filed: Jul. 1, 1983

[30] Foreign Application Priority Data

Jul. 5, 1982 [FR] France .................. 82 11779

[51] Int. Cl.⁴ ............................................. F06B 3/24
[52] U.S. Cl. .................................. 428/34; 428/13; 428/212; 428/215; 428/425.6; 428/441; 428/442
[58] Field of Search ............ 428/34, 38, 426, 212–216, 428/425.6, 428, 441, 442, 13; 52/171–173 R

[56] References Cited

U.S. PATENT DOCUMENTS

| | | | |
|---|---|---|---|
| 3,783,084 | 1/1974 | Quenett | 161/45 |
| 4,011,356 | 3/1977 | Lambert | 428/34 |
| 4,019,295 | 4/1977 | Derner | 52/171 |
| 4,047,351 | 9/1977 | Derner | 52/616 |
| 4,080,482 | 3/1978 | Lacombe | 428/34 |
| 4,120,999 | 10/1978 | Chenel | 428/34 |

Primary Examiner—George F. Lesmes
Assistant Examiner—P. R. Schwartz
Attorney, Agent, or Firm—Oblon, Fisher, Spivak, McClelland & Maier

[57] ABSTRACT

The invention relates to a multiple window glass comprising a first laminated glass plate and a second simple or laminated glass plate, parallel to the first and separated from it by a gas layer, the two plates being held together in a gastight manner.

The resin of the laminated glass of the first plate (1) is chosen so that a bar 9 cm long and 3 cm wide, consisting of a laminated glass comprising two glass sheets 4 mm thick joined by a 2 mm layer of this resin, has a critical frequency that differs at most 35% from that of a glass bar having the same length, same width and 4 mm thickness.

15 Claims, 7 Drawing Figures

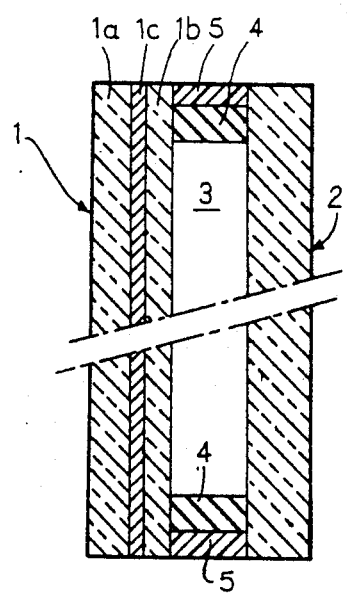
FIG_1
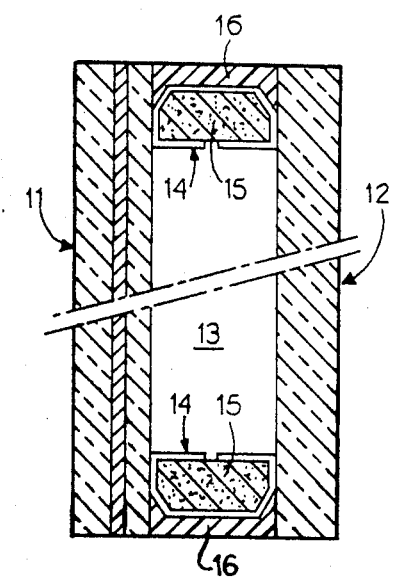
FIG_2
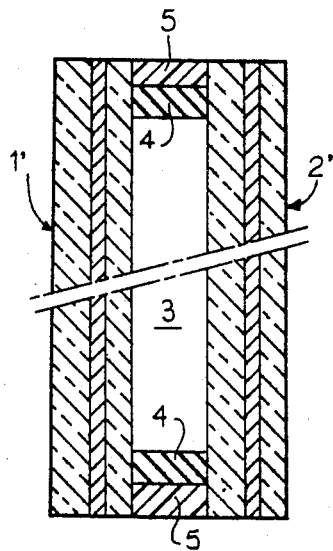
FIG_3
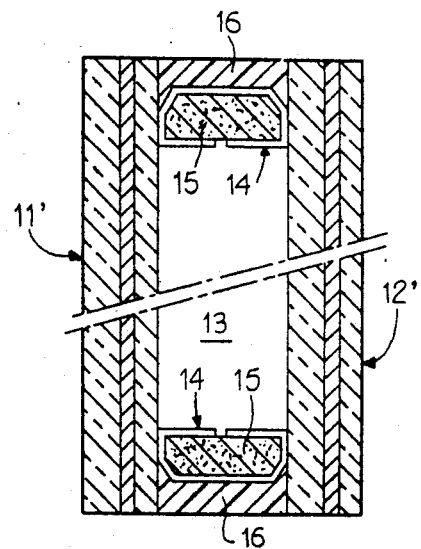
FIG_4

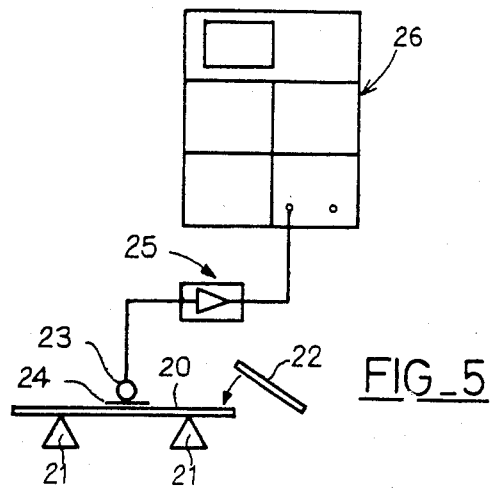
FIG_5
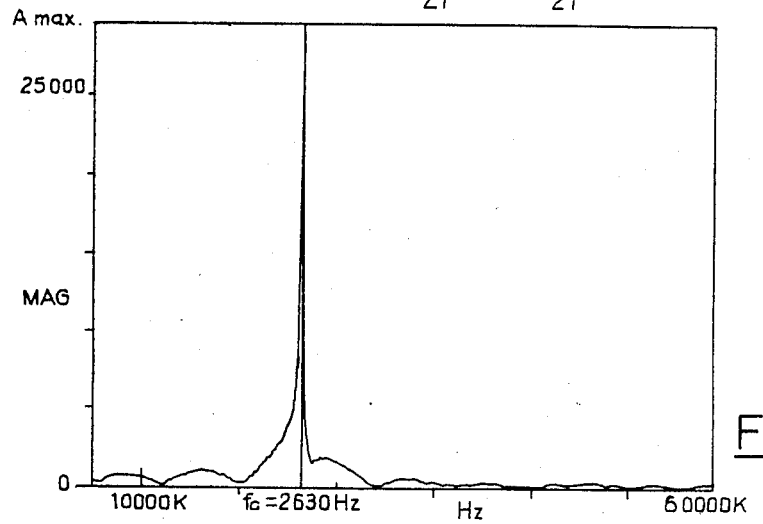
FIG_6
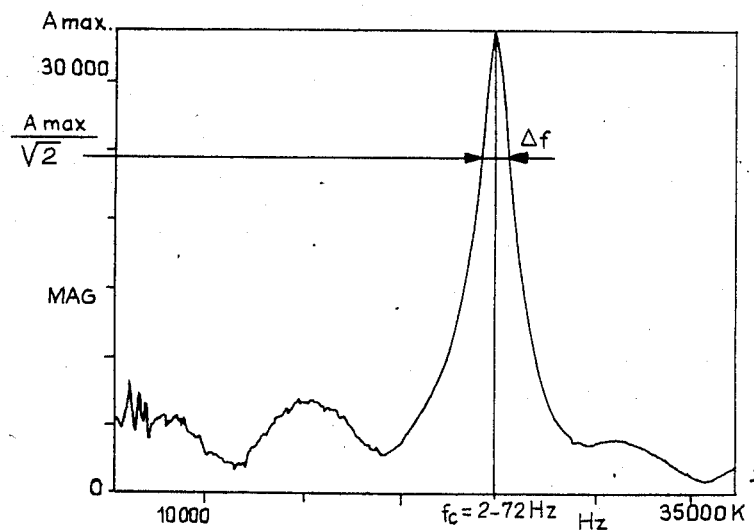
FIG_7

MULTIPLE WINDOW GLASS HAVING THERMAL AND ACOUSTICAL INSULATING PROPERTIES

FIELD OF THE INVENTION

This invention relates to a multiple window glass with improved thermal and acoustical insulating properties.

DESCRIPTION OF THE PRIOR ART

Very many types of simple, laminated and multiple window glasses have already been proposed in the art to meet certain heat or sound insulation requirements.

Thus, in patent application FR No. 77 11228, SAINT-GOBAIN INDUSTRIES proposed an acoustical window exhibiting, in laboratory tests, an acoustical attenuation index between 34 and 38 dB (A) in regard to road traffic, this window comprising a simple or multiple window glass having a surface mass less than or equal to 40 kg/m$^2$ and a thickness less than or equal to 30 mm, which exhibits a characteristic acoustical attenuation index between 31 and 36 dB (A).

In studying these window glasses, it has found that the acoustical or thermal performances are linked to very different design characteristics and that, if an effort is made to make a window glass by known techniques that is simultaneously thermally and acoustically insulating, it must be of great thickness, which is not compatible with the usual frames, so that it has been found to be more economical to use double windows to obtain the desired result.

Thus also French patent No. 2259068 proposes acoustical window glasses comprising glass and plastic laminates, the plastics being selected so that the critical frequency of a laminate is between 0.70% and 0.97% of the critical frequency of a one-piece glass having the thickness of the totality of the laminate. According to this selection criterion, polyvinylbutyral (PVB) constitutes an insert that gives the acoustical laminates and window glasses that comprise them advantageous acoustical characteristics.

SUMMARY OF THE INVENTION

However, it has also been found that window glasses in which PVB is used as the insert have only mediocre acoustical characteristics.

It has now been found that by using a resin meeting the original conditions, different from those proposed to said patent FR No. 2259068, to join the sheets of a glass laminate, the latter exhibits qualities of damping audible sounds that are particularly satisfactory, quite superior to those obtained so far, and that by combining this laminate with a simple glass or a second laminated glass and by meeting certain dimensional conditions, it is possible to make a multiple window glass exhibiting both excellent thermal and acoustical insulating characteristics.

An object of the invention is therefore to make a multiple window glass exhibiting these properties and whose thickness is compatible with the rabbets of the usual frames.

Another object of the invention is to propose this window glass which can be made by standard techniques and which therefore is competitive in price with existing multiple window glasses.

Moreover, another object of the present invention is to provide a multiple window glass exhibiting a particular index of acoustical attenuation, according to standard NF S 31-051, of at least 38 dB (A) for road traffic noise and being capable of reaching 42 dB (A) for certain embodiments.

To attain these and other objects, the invention provides a multiple window glass comprising a first laminated glass plate and a second simple or laminated glass plate parallel to the first plate and separated from it by a gas layer, the two glass plates being held together in a gastight manner. The multiple window glass has a first laminated glass plate which comprises two sheets of simple glass with a thickness between 3 and 8 mm, joined by a layer of resin with a thickness at most equal to 10 mm and, a gas layer which has a thickness between 6 and 30 mm and a second plate which has a thickness greater than 8 mm, in the case of a simple glass, or is of a laminated glass meeting the same thickness criteria and the laminated glass of the first plate. Further, the resin of the laminated glass of the first plate is selected so that a bar 9 cm long and 3 cm wide, consisting of a laminated glass comprising two glass sheets 4 mm thick joined by a 2 mm layer of this resin, has a critical frequency that differs 35% at most from that of a glass bar having the same length, same width and 4 mm thickness.

The choice of the resin of the laminated glass is an essential criterion of sound insulation of the multiple window glass according to the invention. The method for determination of the critical frequency making this choice possible will be described herein. Of the resins that can be used, there can be mentioned the mixture of a polyfunctional polyol component and a polyfunctional isocyanate component, the numerical ratio of the isocyanate groups to that of the hydroxyl groups being between 0.2 and 0.6 and, preferably, between 0.25 and 0.45, as described in the publication of French patent FR No. 2 464 139 of SAINT-GOBAIN INDUSTRIES, this resin being called below polyol resin with polyurethane groups; resins with a methacrylate base, resins with a polyvinyl chloride (PVC) will also be mentioned.

On the other hand, in a surprising manner, the resins used in the usual way as the insert layer in laminated glasses, polyvinylbutyral, for example, do not meet the condition of the critical frequency mentioned above and therefore cannot be used within the context of the invention.

Multiple window glasses according to the invention exhibit an excellent index of acoustical attentuation in regard to road traffic, since it is at least equal to 38 dB (A), according to standards NF S 31-051 and NF S 31-045.

As indicated above, the thickness of the glass sheets of the first laminated glass plate will be 6 mm at most, on the one hand, to limit the weight of the unit, but especially because greater thicknesses would cause an reduction of the acoustical characteristics in the medium frequencies, because of a too low coincidence frequency of the glasses.

The choice between a simple glass and a multiple glass for the second glass plate should take into account the acoustical characteristics of the window that is to be equipped with the window glass. Actually, simple glass will give the glass less acoustical attenuation than a laminated glass, in the medium and high frequencies, but, if this attenuation stays above that of the window properly so-called for the same frequencies, this simple glass can advantageously be used. It should be kept in mind that, if the thickness of the latter glass is too slight, its acoustical characteristics will be mediocre in the low frequencies and that, if this thickness is too great, the results obtained will leave something to be desired in the medium frequencies. Generally, the optimal thickness of the simple glass plate will be on the order of 10 mm.

It has been found that the range of thicknesses listed above is completely compatible with the dimensions of the usual window frames so that setting the multiple window glass according to the invention poses no problem for the users.

Naturally, the frame themselves should have excellent thermal and acoustical performances, particularly for the medium and high frequencies. For example, dense wood (specific mass equal to or greater than 0.8, thicknesses at least equal to 54 mm) or polyvinyl chloride shapes filled with resin should be used. Preferably two-leafed windows, carrying the ACOTHERM label, will be used.

The thermal insulating performances of the window glass according to the invention are comparable to those of multiple window glasses that comprise at least two glasses separated by a volume of gas (generally dry air or sulfur hexafluoride).

The accompanying drawings illustrate the invention. In these drawings:

FIGS. 1 to 4 are cross sections of four embodiments of the invention;

FIG. 5 is a diagram of an apparatus used for measuring the critical frequency of the glass bar;

FIGS. 6 and 7 show the curves obtained with this apparatus for a glass bar and for a laminated glass bar comprising a layer of resin that can be used within the context of the invention.

The multiple window glass shown in FIG. 1 comprises a laminated glass plate 1 and a simple glass plate 2, separated by a layer 3 of dry air and put together in a gastight manner, by two beads of adhesive material forming joints, inside joint 4, for example, consisting of polyisobutylene and butyl rubber, with a dessicant incorporated, while outside joint 5 is made of polysulfide.

This mode of assemblying glass sheets with two types of bead is described in application FR No 74 40827.

Laminated window glass 1 is of the type known as 6(2)4, i.e., it comprises a glass sheet 1a, 6 mm thick, a glass sheet 1b, 4 mm thick, and a layer of resin 1c, 2 mm thick, this resin having been selected by the criteria that are described herein. In this case, it is a resin sold under the name DEGLAN VP 700, which is a methacrylate base resin.

Glass sheet 2 has a thickness of 10 mm and dry air layer 3 is 12 mm thick. This window glass, tested by standard NF S 31-051, exhibits an acoustical attenuation index of 39 dB (A) for road traffic noise. It exhibits a quality index of 43 dB, according to standard ISO 717.

The 12 mm space between laminated glass plate 1 and the simple glass plate can be filled with sulfur hexafluoride ($SF_6$). It gives the window glass slightly improved acoustical properites; thus the quality index according to standard ISO 717 is brought to 45 dB. A window itself having excellent acoustical performances, particularly a dense wood window 54 mm thick, or polyvinyl chloride shapes, preferably with several chambers filled with resin, equipped with this window glass having an air layer or $SF_6$ gas layer, exhibits an acoustical attenuation index to road traffic noise of 40 dB (A) according to standard NF S 31-051.

The multiple window glass shown in FIG. 2 again comprises a laminated glass plate 11 of the 6(2)4 type, identical with plate 1 of the window glass of FIG. 1, and a simple glass plate 12, identical with plate 2 of FIG. 1. Air layer 13, separating plates 11 and 12, however, has a thickness of 20 mm and the plates are kept apart by rigid internal inserts 14, for example, of aluminum, filled with a dessicant product 15, the plates being put together by an outside bead 16 of a gastight resin, for example, polysulfide or butyl rubber.

This mode of mounting and putting together glass sheets with the rigid inserts is preferred when the gas layer separating the glass sheets has a considerable thickness, as in the present case (20 mm).

This window glass exhibits an acoustical attenutation index toward road traffic of 39 dB (A), according to standard NF S 30-051, and a quality index of 44 dB, according to standard ISO 717.

The 20-mm space separating laminated glass plate 11 and simple glass 12 can be filled with a gas other than air, for example, with $SF_6$. In this case, the acoustical attenuation index according to standard NF S 30-051 is 42 dB (A) and the quality index according to standard ISO 717 is 47 dB. When these window glasses are mounted in a window having good acoustical performances, an acoustical attenuation index according to standard NF S 31-051 on the order of 41 dB (A) is attained for the unit thus constituted. These glasses can also be made with polyol resin having polyurethane groups or PVC base resin, and lead to the same performances.

The window glasses shown in FIGS. 3 and 4 are identical respectively with those of FIGS. 1 and 2, and the elements are already described are designated by the same reference numbers, the only difference being that the simple glass plates 2, or 12, have been replaced by laminated glass plates 2', or 12', identical with plates 1 and 11 and that the glass sheets of the laminated glass plates of the 4(2)4 type have been joined by a polyol resin having polyurethane groups.

The window glass of FIG. 3 exhibits an acoustical attenuation index of 39 dB (A) in regard to road traffic, according to standard NF S 31-051, and a quality index of 46 dB, according to standard ISO 717.

For the window glass of FIG. 4, the same indices are respectively equal to 39 dB (A) and 47 dB, when the gas between the plates is air, and respectively 42 dB (A) and 51 dB, when the gas is $SF_6$.

The resins used to make the laminated window glasses can be poured in situ or be resins in prefabricated sheets. In the case of resins in sheets, it is particularly easy to obtain slight thicknesses of resin; for acoustical performances on the same order of magnitude, the thickness of the resin of the laminates can be reduced and be as low as about 0.3 mm. One or more sheets placed side by side could thus form the resin layer.

The method that makes it possible to choose a resin that can be used in the context of the invention will now be described with reference to FIG. 5.

It is known that the energy gained by an object subjected to a shock generates a vibration phenomenon and that immediately after the shock, the object which has come back free vibrates in its own mode. A vibration frequency is associated with each mode. The amplitude of the vibration depends on the initial excitation, i.e., the spectral component of the shock (amplitude of the shock at the frequency studied) and the zone of impact of the shock, the modal deformation being more or less great depending on whether the shock occurred at the antinode or node of vibration.

For a particular mode to be excited, it is necessary:

(1) that the deformation caused at the point of impact not be located on the node of vibration of the mode, (2) that the energy spectrum of the shock have a component at the resonance frequency of the mode.

This last condition is almost always met, because a very brief shock exhibits a practically uniform energy spectrum.

The first condition is also met and, for a bar that is free at its ends, for example, it suffices to tap at one end to excite all the modes.

Actually, only the first six modes at most are successfully measured. The vibratory energy gained by a shock is dissipated during the course of time and more rapidly the more the material is damped.

For a given material, the modes are dissipated faster the higher the associated resonance frequency so that at the end of a certain time, and during a certain time, only the first mode remains.

The measurement principle therefore consists in making an analysis of the vibration frequencies of a bar subjected to a shock and in marking the position of the resonance frequencies (frequencies for which the vibration amplitude is clearly greater than in the rest of the spectrum).

For making the measurement (FIG. 5) there are successively used bars 20 which are 9 cm long and 3 cm wide, first of a glass 4 mm thick, then of a 4(2)4 laminated glass, in which the glass sheets 4 mm thick are put together by a layer 2 mm thick of the resin to be tested.

Bar 20 rests on two foam supports 21, placed approximately at the nodes of vibration of the first mode (fundamental mode) of dynamic bending of the bar. The latter is excited by a shock exerted by striking of its free ends with a small object 22, such as a rule.

The transitory response of the bar to this excitation is picked up by a microphone 23, placed on a support 24, very close to the surface of the bar 20, in its middle (pressure antinode). The time signal picked up by microphone 23 is amplified by amplifier 25, then analyzed in frequency by a Fourier analyzer 26.

In general, ten tests are made for the same bar 20 to reduce the influence of outside noises.

As can be seen in FIGS. 6 and 7, the curves obtained, which represent amplitude A of the vibrations as a function of their frequency, respectively for a glass bar and a laminated glass bar comprising a resin to be tested within the context of this invention, make it possible to detect precisely the resonance frequency of the fundamental mode of vibration of bending (critical frequency). In the examples shown, the critical frequency of the glass bar is 2630 Hz, while that of the laminated glass bar is 2472 Hz. This frequency differs less than 10% from that of the glass and therefore less than 35%, and the resin tested can consequently be used to make laminated glasses going into the makeup of the multiple window glass according to the invention.

The test that has just been described and which is very simple to use also makes it possible to determine the damping at bending V or bar 20, which is defined as the ratio $\Delta f/f_c$, where $\Delta f$ represents the difference of the frequencies corresponding to an amplitude equal to that of the critical frequency $f_c$, divided by $\sqrt{2}$.

Surprisingly, damping V at bending cannot be considered as a criterion for determining the resins that can be used within the context of the invention.

Thus, for five resins A, B, C, D and E, respectively of the polyol type having polyurethane groups, methacrylate (VP 700), PVC base resin (ALG film of SEKISUI), acrylic resin used for making window glass sold under the tradename "CASOGLAS," and polyvinylbutyral, measurements of the critical frequency $f_c$ and damping at bending V, made on various laminated glass bars, gave the following results:

| SAMPLE | RESIN | | | | | | | | | |
|---|---|---|---|---|---|---|---|---|---|---|
| | A | | B | | C | | D | | E | |
| | $f_c$ | V | $f_c$ | V | $f_c$ | V | $f_c$ | V | $f_c$ | V |
| 1 | 2528 | 5 | 2533 | 8.1 | 3485 | 21.3 | — | — | 4580 | 11.6 |
| 2 | 2461 | 5.1 | 2521 | 7.6 | 3465 | 20.4 | 3890 | 11.5 | 4410 | 12.3 |
| 3 | 2441 | 5.1 | 2508 | 5.6 | 3428 | 21.3 | — | — | 4394 | 11.9 |

A glass bar tested under the same conditions exhibits the following characteristics:

$f_c = 2629$ Hz; $V = 1\%$

It is found that, for laminated glass sheets made with resins A, B and C the critical frequence $f_c$ differs less than 35% from that of the glass, so that these laminated glasses can be used to make a window glass according to the invention, whereas such is not the case for the laminated glasses made with resins D and E. On the contrary, dampings V obtained for laminated glasses made with resins D and E are higher, therefore, better, than those corresponding to resins A and B. Therefore, it would have been expected that the laminated glasses made with resins D and E would lead to good results in their application to the window glass according to the invention, which is not the case.

Damping at bending therefore does not constitute a reliable criterion for determining the resins that can be used within the context of the invention.

What claimed as new and desired to be secured by Letters Patent of the United States is:

1. Multiple window glass comprising a first laminated glass plate and a second simple or laminated glass plate, parallel to the first plate and separated from it by a gas layer, the two plates being held together in a gastight manner wherein said first laminated glass plate comprises two simple glass sheets with a thickness between about 3 and 8 mm, joined by a layer of resin with a thickness at most equal to 10 mm and wherein the gas layer has a thickness between 6 and 30 mm and wherein the second plate has a thickness greater than 8 mm in the case of a simple glass, or is of a laminated glass meeting the same thickness criteria as the laminated glass of the first plate, and wherein the resin of the laminated glass of the first plate is chosen so that a bar 9 cm long and 3 cm wide, consisting of a laminated glass comprising two glass sheets 4 mm thick joined by a 2 mm layer of this resin, has a critical frequency that differs at most 35% from that of a bar of glass having the same length, the same width and 4 mm thickness.

2. Multiple window glass as in claim 1, wherein the resin of the laminated glass is a methacrylate base resin, a PVC base resin, or a resin having a base of a polyfunctional isocyanate component, the polyol component being used in excess, wherein the numeric ratio of the isocyanate groups to that of the hydroxyl groups is between 0.2 and 0.6.

3. Multiple window glass as in one of claims 1 and 2, wherein the first laminated glass plate and the second simple glass or laminated glass plate are put together in a gastight manner by two beads of plastic.

4. Window glass as in one of claims 1 and 2, wherein the first laminated glass plate and the second simple glass or laminated glass plate are separated by rigid inserts and are put together in a gastight manner by at least a bead of plastic.

5. Window glass claim 1, wherein said window glass exhibits an acoustical attenuation to road traffic noise, measured according to standard NF S 31-051, at last equal to 38 dB (A).

6. A window with a frame having high acoustical performance, having a window glass as in claim 1, wherein said window exhibits an acoustical attenuation to road traffic noise, measured according to standard NF S 31-051, at least equal to 40 dB (A).

7. Acoustical window glass comprising at least a laminated window glass, wherein the resin of the laminated window glass is such that a bar 9 cm long and 3 cm wide, consisting of a laminated glass comprising two glass sheets 4 mm thick joined by a 2 mm layer of this resin, has a critical frequency that differs at most about 35% from that of a bar of glass having the same length, the same width and 4 mm thickness.

8. Window glass as in claim 1, wherein the resin is a resin in prefabricated sheets, the layer of resin used comprising one or more sheets placed side by side.

9. The multiple window glass as in claim 2, wherein for the mixture of said polyfunctional polyol component and said polyfunctional isocyanate component, the numerical ratio of the isocyanate to hydroxyl groups is between about 0.25 and 0.45.

10. The multiple window glass as in claim 1, wherein said first laminated glass plate has a thickness of 6 mm.

11. The multiple window glass as in claim 1, wherein the simple glass for the second glass plate has a thickness of 10 mm.

12. The multiple window glass as in claim 1, wherein said layer of resin joining the two simple glass sheets of the first laminated glass plate has a thickness of between about 0.3 and 3 mm.

13. The multiple window glass as in claim 1, wherein said gas layer has a thickness between 6 and 20 mm.

14. The multiple window glass as in claim 1, wherein the gas in said gas layer is dry air or sulfur hexafluoride.

15. The multiple window glass as in claim 1, wherein the first laminated glass plate and the second simple or laminated glass plate parallel to said first plate are held together in a gastight manner by two beads of adhesive material forming an inside joint consisting of polyisobutylene and butyl rubber, and an outside joint of polysulfide, and wherein said glass plate in parallel are kept apart by rigid internal inserts having a dessicant material incorporated therein.

* * * * *